(12) United States Patent
Lakemond

(10) Patent No.: US 12,340,528 B2
(45) Date of Patent: *Jun. 24, 2025

(54) DETERMINING DOMINANT GRADIENT ORIENTATION IN IMAGE PROCESSING USING DOUBLE-ANGLE GRADIENTS

(71) Applicant: Imagination Technologies Limited, Kings Langley (GB)

(72) Inventor: Ruan Lakemond, Cheltenham (AU)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/431,631

(22) Filed: Feb. 2, 2024

(65) Prior Publication Data

US 2024/0242362 A1 Jul. 18, 2024

Related U.S. Application Data

(63) Continuation of application No. 17/838,100, filed on Jun. 10, 2022, now Pat. No. 11,893,754, which is a
(Continued)

(30) Foreign Application Priority Data

Dec. 21, 2018 (GB) .................................. 1820923

(51) Int. Cl.
*G06K 9/00* (2022.01)
*G06F 18/22* (2023.01)
(Continued)

(52) U.S. Cl.
CPC ............... *G06T 7/44* (2017.01); *G06F 18/22* (2023.01); *G06T 7/73* (2017.01); *G06V 10/469* (2022.01);
(Continued)

(58) Field of Classification Search
CPC .... G06T 7/44; G06T 7/73; G06T 7/13; G06T 7/269; G06T 5/00; G06T 2207/10024;
(Continued)

(56) References Cited

U.S. PATENT DOCUMENTS 6,047,893 A 4/2000 Saporetti
8,884,985 B2 11/2014 Shibata et al.
(Continued)

FOREIGN PATENT DOCUMENTS

AU 2009251208 A1 7/2011
CN 107066958 A 8/2017
(Continued)

OTHER PUBLICATIONS

Felsberg, "Channel Smoothing: Efficient Robust Smoothing of Low-Level Signal Features," IEEE Transactions on Pattern Analysis and Machine Intelligence, Feb. 2006, vol. 28:2, pp. 209-222, IEEE Computer Society.
(Continued)

*Primary Examiner* — Duy M Dang
(74) *Attorney, Agent, or Firm* — Potomac Law Group, PLLC; Vincent M DeLuca

(57) ABSTRACT

Methods and image processing systems are provided for determining a dominant gradient orientation for a target region within an image. A plurality of gradient samples are determined for the target region, wherein each of the gradient samples represents a variation in pixel values within the target region. The gradient samples are converted into double-angle gradient vectors, and the double-angle gradient vectors are combined so as to determine a dominant gradient orientation for the target region.

20 Claims, 11 Drawing Sheets

Related U.S. Application Data continuation of application No. 16/724,249, filed on Dec. 21, 2019, now Pat. No. 11,386,571.

(51) Int. Cl.
*G06T 7/44* (2017.01)
*G06T 7/73* (2017.01)
*G06V 10/46* (2022.01)

(52) U.S. Cl.
CPC .. *G06T 2207/10024* (2013.01); *G06V 10/473* (2022.01)

(58) Field of Classification Search
CPC . G06T 2207/10004; G06T 2207/10016; G06T 7/00; G06F 18/22; G06V 10/473; G06V 10/469; G06V 10/20
See application file for complete search history.

(56) References Cited

U.S. PATENT DOCUMENTS

| | | | |
|---|---|---|---|
| 11,386,571 B2* | 7/2022 | Lakemond | G06V 10/469 |
| 2013/0321673 A1 | 12/2013 | Lim et al. | |
| 2015/0221068 A1 | 8/2015 | Martenson et al. | |

FOREIGN PATENT DOCUMENTS

| | | |
|---|---|---|
| CN | 107085728 A | 8/2017 |
| CN | 108510640 A | 9/2018 |
| EP | 3100235 A1 | 12/2016 |

OTHER PUBLICATIONS

Johansson et al., "Fast Selective Detection of Rotational Symmetries using Normalized Inhibition," Proceedings of the 12th European Conference on Computer Vision, ECCV 2012, Jan. 2000, vol. 1842, 17 pages, Springer Berlin Heidelberg.
Weickert, "Theoretical Foundations of Anisotropic Diffusion in Image Processing," Computing, Jan. 1996, vol. 11, pp. 221-236, Springer Verlag, Vienna Austria.
Felsberg, "Low-Level Image Processing with the Structure Multivector," Mar. 15, 2002; www.informatik.uni-kiel.de/reports/2002/0203. html; 216 pages.
Perona et al., "Scale-Space and Edge Detection Using Anisotropic Diffusion," IEEE Transactions on Pattern Analysis and Machine Intelligence, vol. 12, No. 7, Jul. 1990, pp. 629-639.
Weickert, "A Review of Nonlinear Diffusion Filtering," 26 pages.
Felsberg et al., "Channel Smoothing: Efficient Robust Smoothing of Low-Level Signal Features," IEEE Transactions on Pattern Analyis and Machine Intelligence, vol. 28, No. 2, Feb. 2006.
Weickert, "Theoretical Foundations of Anisotropic Diffusion in Image Processing," Computing, Jan. 1996, vol. 11, Computing, Supplement 11, pp. 221-236 (1996).

* cited by examiner

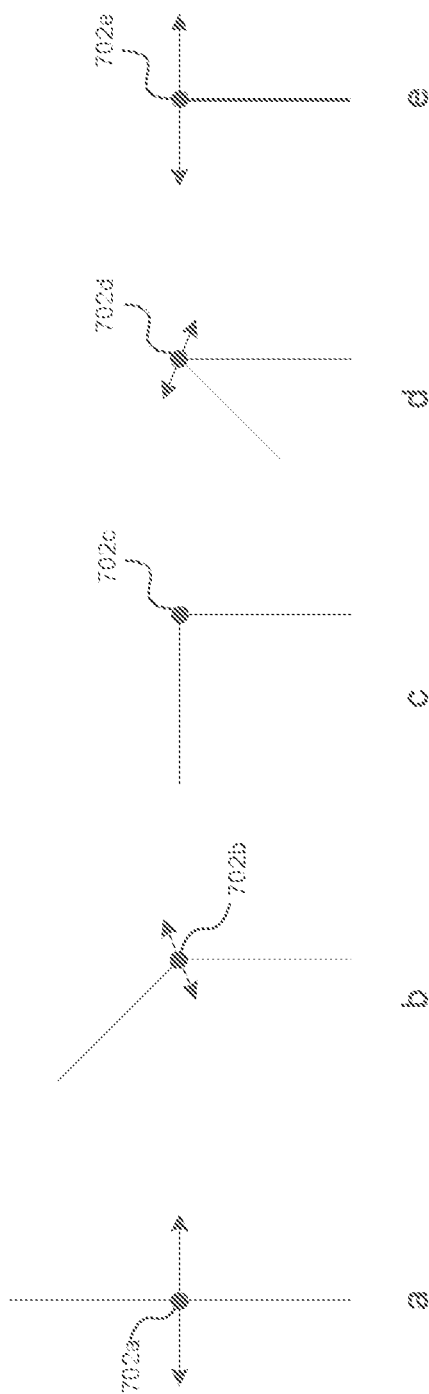

DETERMINING DOMINANT GRADIENT ORIENTATION IN IMAGE PROCESSING USING DOUBLE-ANGLE GRADIENTS

CROSS-REFERENCE TO RELATED APPLICATIONS AND CLAIM OF PRIORITY

This application is a continuation under 35 U.S.C. 120 of copending application Ser. No. 17/838,100 filed Jun. 10, 2022, now U.S. Pat. No. 11,893,754, which is a continuation of prior application Ser. No. 16/724,249 filed Dec. 21, 2019, now U.S. Pat. No. 11,386,571, which claims foreign priority under 35 U.S.C. 119 from United Kingdom Application No. 1820923.9 filed Dec. 21, 2018, the contents of which are incorporated by reference herein in their entirety.

BACKGROUND

The present disclosure relates to image processing. In particular, the present disclosure relates to a method of determining a dominant gradient orientation for a target region within an image.

Finding the dominant gradient orientation that represents the variation in pixel values in a target region of an image can be useful for a number of different image processing functions.

Local gradients are typically determined based on differences between pairs of pixel values. However, previous approaches for determining local gradients do not reliably identify dominant gradient orientations. Three previous approaches are discussed below.

In a first previous approach, an average local gradient angle for a target pixel can be determined. Considering a kernel of pixels surrounding a target pixel, a gradient sample for each of the surrounding pixels is determined by assessing the difference in pixel value between the target pixel and each respective surrounding pixel. The gradient samples are then averaged to find a local gradient vector for the target pixel. However, when averaged, opposing gradients cancel out—and thus gradient information for thin-line structures can be lost.

In a second previous approach, the magnitude of the gradient samples can be taken before averaging. This avoids the problem of opposing gradients cancelling out. However, it does so at the expense of losing the directional information. That is, this approach outputs a gradient magnitude, but with no indication as to the direction of the gradient.

In a third previous approach, absolute gradients are measured in multiple directions separately. For example, a gradient component parallel to the x axis can be determined as, $|g_x(x, y)|=|v(x+1, y)-v(x, y)|+|v(x-1, y)-v(x, y)|$, and a gradient component parallel to the y axis can be determined as, $|g_y(x, y)|=|v(x, y+1)-v(x, y)|+|v(x, y-1)-v(x, y)|$, where $v(x, y)$ represents an image value at position $(x, y)$. Gradients could be calculated in other directions in this manner (e.g. along 45° angles). In this way some direction information is recovered. However, the angular resolution is reduced to the number of separate directions sampled.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

According to a first aspect of the disclosure there is provided a method of determining a dominant gradient orientation for a target region within an image, the method comprising: determining a plurality of gradient samples for the target region, wherein each of the gradient samples represents a variation in pixel values within the target region; converting the gradient samples into double-angle gradient vectors; combining the double-angle gradient vectors; and determining a dominant gradient orientation for the target region in dependence on the combined double-angle gradient vectors.

The target region may be a region surrounding a target pixel.

Each of the gradient samples may be determined by determining a difference between: (i) the pixel value at the target pixel, and (ii) a pixel value of a neighbouring pixel positioned in a respective direction with respect to the target pixel.

The gradient samples may be in a single-angle domain and the double-angle gradient vectors may be in a double-angle domain.

Converting the gradient samples into double-angle gradient vectors may comprise representing the gradient samples in polar coordinates and multiplying their angular components by two.

Combining the double-angle gradient vectors may comprise determining a compound gradient vector for the target region.

Determining the dominant gradient orientation for the target region may comprise converting the compound gradient vector to a dominant gradient vector, the dominant gradient vector representing the dominant gradient orientation for the target region.

The compound gradient vector may be in a double-angle domain and converting the compound gradient vector to the dominant gradient vector may comprise converting the compound gradient vector into a single-angle domain.

Converting the compound gradient vector to the dominant gradient vector may comprise representing the compound gradient vector in polar coordinates and dividing its angular component by two.

Combining the double-angle gradient vectors may comprise averaging the double-angle gradient vectors.

Combining the double-angle gradient vectors may comprise filtering the double-angle gradient vectors.

Filtering the double-angle gradient vectors may comprise combining the double-angle gradient vectors using a weighted sum.

Each pixel value may comprise one or more characteristics of the respective pixel.

Each characteristic may be one or more of luma, luminance, chrominance, brightness, lightness, hue, saturation, chroma, colourfulness, or any colour component.

There may be provided a method of steering an anisotropic filter in dependence on the determined dominant gradient orientation.

The anisotropic filter may use an elliptical filter kernel which has a minor axis and a major axis, and the method may comprise aligning the minor axis of the elliptical filter kernel with the determined dominant gradient orientation.

The method of steering the anisotropic filter may further comprise determining the eccentricity of the elliptical filter kernel in dependence on the magnitude of the compound gradient vector.

According to a second aspect of the present disclosure there is provided an image processing system for determining a dominant gradient orientation for a target region within an image, the image processing system comprising: a gradient sampling unit configured to determine a plurality of gradient samples for the target region, wherein each of the gradient samples represents a variation in pixel values within the target region; a conversion unit configured to convert the gradient samples into double-angle gradient vectors; a combining unit configured to combine the double-angle gradient vectors; and a determining unit configured to determine a dominant gradient orientation for the target region in dependence on the combined double-angle gradient vectors.

The combining unit may be configured to combine the double-angle gradient vectors by determining a compound gradient vector for the target region, and the determining unit may be configured to determine the dominant gradient orientation for the target region by converting the compound gradient vector to a dominant gradient vector, the dominant gradient vector representing the dominant gradient orientation for the target region.

The compound gradient vector may be in a double-angle domain and the determining unit may be configured to convert the compound gradient vector to the dominant gradient vector by converting the compound gradient vector into a single-angle domain.

There may be provided an image processing system configured to perform the method as described herein. The image processing system may be embodied in hardware on an integrated circuit. There may be provided a method of manufacturing, at an integrated circuit manufacturing system, the image processing system, the method comprising: processing, using a layout processing system, a computer readable description of the graphics processing system so as to generate a circuit layout description of an integrated circuit embodying the image processing system; and manufacturing, using an integrated circuit generation system, the image processing system according to the circuit layout description. There may be provided an integrated circuit definition dataset that, when processed in an integrated circuit manufacturing system, configures the system to manufacture the image processing system. There may be provided a non-transitory computer readable storage medium having stored thereon a computer readable description of an integrated circuit that, when processed in an integrated circuit manufacturing system, causes the integrated circuit manufacturing system to manufacture the image processing system.

There may be provided an integrated circuit manufacturing system comprising: a non-transitory computer readable storage medium having stored thereon a computer readable integrated circuit description that describes the image processing system; a layout processing system configured to process the integrated circuit description so as to generate a circuit layout description of an integrated circuit embodying the image processing system; and an integrated circuit generation system configured to manufacture the image processing system according to the circuit layout description.

There may be provided computer program code for performing the method as described herein. There may be provided non-transitory computer readable storage medium having stored thereon computer readable instructions that, when executed at a computer system, cause the computer system to perform the methods as described herein.

BRIEF DESCRIPTION OF THE DRAWINGS

The present invention is described by way of example with reference to the accompanying drawings. In the drawings:

FIG. 5 is a schematic depicting the determination of a dominant gradient orientation.

FIG. 10 depicts idealised dominant gradient orientations for various structures.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

The present disclosure relates to determining gradient sample vectors that represent variations in pixel or sub-pixel data values within a target region—such as a region surrounding a target pixel or a plurality of target pixels.

Pixel data as used herein shall refer to any kind of element of image information, including pixel data and sub-pixel data. For example, pixels may be pixels of an image, a video frame, or any other representation of image information, including pixels of an intermediate representation which may never be presented or stored (which be formed during image processing or generation of an image in a graphics processing system). Pixels may also represent non-visual information, for example, data in a distance or depth map, or data in a temperature map.

Figure 1:
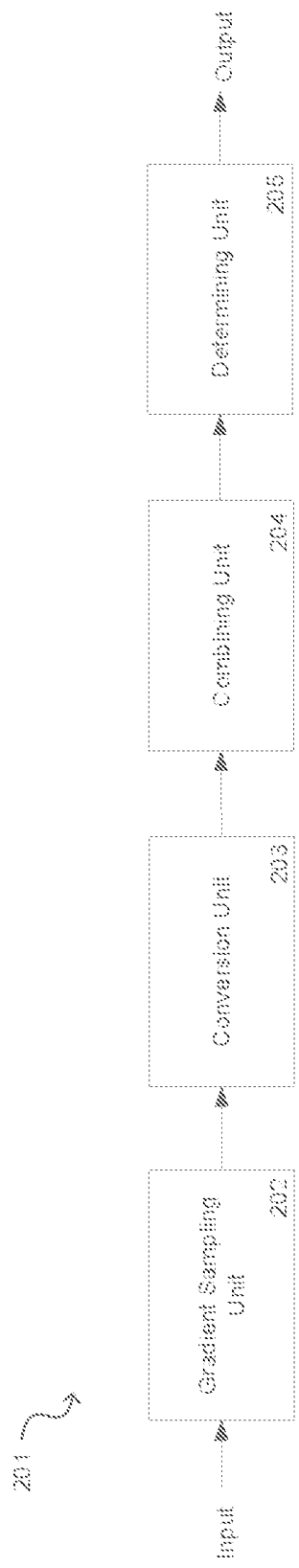
FIG. 1 depicts a system for determining the dominant gradient orientation at a pixel position within an image.

FIG. 1 depicts an exemplary system 201 for determining a dominant gradient orientation for a pixel within an image. FIG. 1 comprises a gradient sampling unit 202, a conversion unit 203, a combining unit 204 and a determining unit 205. The units 202-205 may be implemented in software, hardware, firmware or any combination thereof.

Pixel data is provided to the system 201. The pixel data may comprise pixel or sub-pixel image information of all or part of an image or video frame. The pixel data may represent all of the pixels of an image, or a subset of the pixels of an image. All of, or a subset of, the pixels of the input may be processed by the system.

Pixels may represent any data that can be represented in an image-like array Each pixel of the input image may comprise a pixel value. Each pixel value may indicate one or more characteristics of the respective pixel. In some examples, pixel values may be used for visualisation. For example, the input may comprise pixel values representing the colour of objects in a captured or rendered scene. For example, the characteristics indicated by the pixel values may include luma, luminance, chrominance, brightness, lightness, hue, saturation, chroma, colourfulness, or any colour component, such as red, green or blue colour components. In other examples, the input may comprise any other pixel values suitable for visualisation (e.g. a temperature map in which the pixels may be assigned false-colours in dependence on their respective values).

Pixel values may also represent other characteristics. Such pixel values may be primarily intended for processing and/or analysis. For example, pixel values may represent characteristics such as image depth (depth map), surface normals (normal map), surface texture (albedo map). In some examples, such pixel data may be derived from an image by a renderer. For example, the input to the system 201 may be a map derived from an image (e.g. by ray tracing). In an example, depth and/or distance information may be derived using a radar or lidar system, and input to the system as an image comprising pixel values representing the measured depths/distances.

Gradient Sampling

Gradient samples represent variation in pixel values within a target region. The target region may be a region surrounding a target pixel or a plurality of target pixels.

Gradient samples may be determined by gradient sampling unit 202. The gradient sampling unit 202 may assess the variation in pixel values within the target region about a target pixel or pixels. Different gradient samples can be determined in different respective directions.

Considering the target region to be a kernel of pixels surrounding a target pixel, a gradient sample for each of the surrounding pixels may be determined by assessing the difference in pixel value between the target pixel and each respective surrounding pixel.

Figure 2A:
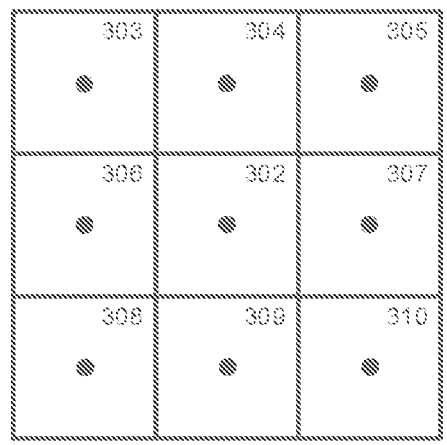
FIG. 2a depicts a 3×3 kernel of pixels.

For example, in FIG. 2a, a 3×3 kernel of pixels centred on a target pixel at position (x, y) are considered. In this case, eight neighbouring pixels 303, 304, 305, 306, 307, 308, 309 and 310 surround target pixel 302.

In this example, a gradient sample, g, from an image can be determined by comparing a pixel value of the target pixel, v(x, y), to the pixel value for each of the neighbouring pixels, v((x+$\Delta_x$), (y+$\Delta_y$)). That is, a gradient sample, g, may be calculated according to:

$$g = v((x + \Delta_x), (y + \Delta_y)) - v(x, y)$$

With the 3×3 kernel shown in FIG. 2a, $\Delta_x, \Delta_y \in \{-1, 0, 1\}$. Each separate gradient sample, g, can be written as a vector of the form $$g = g\begin{bmatrix} \cos\theta \\ \sin\theta \end{bmatrix},$$

where g is given by the equation above, and $\theta$=a tan 2($\Delta_y$, $\Delta_x$).

In an example, four gradient samples may be determined. For example, gradient samples may be determined for the pixels immediately above, below, left and right of the target pixel. That is, with reference to FIG. 2a, for pixels 304, 306, 307 and 309.

The pixels on the diagonals from a target pixel may additionally or alternatively be considered. For instance, in the example shown in FIG. 2a, eight gradient samples may be determined by also considering pixels 303, 305, 308 and 310. When determining the gradient samples for pixels on the diagonals from the target pixel, the magnitudes of those gradient samples on the diagonals may be normalised by multiplication by a factor of $1/\sqrt{2}$ so as to account for the greater distance between the target pixel and the surrounding pixel. Generally, a gradient sample may be formed as the difference between two pixel values, scaled to account for the distance between those two pixels.

Gradient samples for a kernel could be determined by assessing the difference between all combinations of pixel pairs in a kernel. This approach may improve the accuracy of the image processing system by considering more information—and therefore lessening the effect of outliers, e.g. resulting from noise, on the dataset. However, this approach would generally increase the computational load and/or power requirements of the image processing system.

Figure 2B:
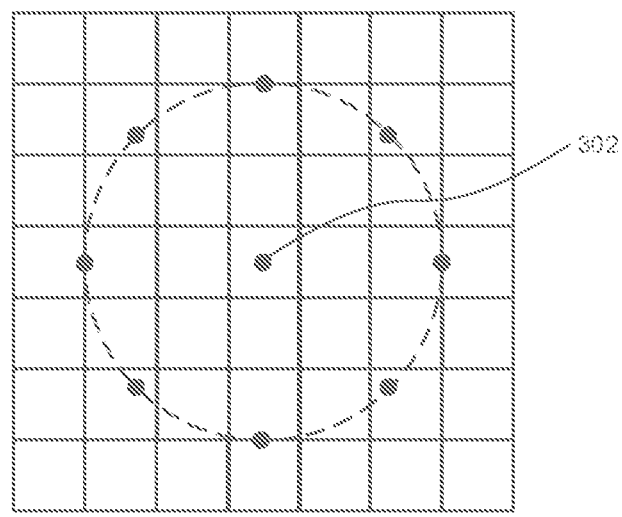
FIG. 2b illustrates an alternative method for selecting sample points.

Fewer than one gradient sample per pixel position may be determined. That is, it may not be necessary to determine gradient samples for pixel values measured at each and every integral pixel location. For example, with reference to FIG. 2b, gradient samples could be determined for sampling points positioned on the circumference of a circle centred on the target pixel 302. If a sampling point falls between pixel positions, a value for the sampling point may be calculated by interpolating (e.g. bilinearly or bicubicly interpolating) between the pixel values of nearby (e.g. surrounding) pixels, e.g. by performing bilinear interpolation of the pixel values of the four nearest pixels to the sampling point. Any suitable sub-pixel sampling technique may be used to form the value of a sampling point lying between pixels. This approach can advantageously reduce the number of gradient samples to be determined, whilst still considering the local gradients with reference to an evenly distributed selection of points of the input. By determining gradient samples at fewer sample points, this approach may lower the computational load and/or power requirements of an image processing system In an example, an image input may be down-sampled prior to gradient sampling. That is, the resolution of input image may first be reduced. For example, an input image may have a high resolution, such as 4K, and prior to gradient sampling the resolution of the image may be reduced to a lower resolution, such as 720p or 480p. In this manner, each pixel of the lower resolution image may represent a plurality of pixels of the input image. This is one example of how gradient samples can be determined for a target region. This approach may also lower the computational load and/or power requirements of an image processing system.

Gradient Sample Conversion

The conversion unit 203 is configured to convert gradient samples to double-angle gradient vectors.

The double-angle gradient vectors may encode gradient samples with a double-angle gradient vector that has an angle twice that of the gradient sample.

As stated above, each separate gradient sample, g, can be written as a vector of the form $$g = g\begin{bmatrix} \cos\theta \\ \sin\theta \end{bmatrix},$$

where g is given by $g=v((x+\Delta_x), (y+\Delta_y))-v(x, y)$, and $\theta=a\tan 2(\Delta_y, \Delta_x)$.

Each gradient sample, g, can be converted to a double-angle gradient vector, $g_2$, according to:

$$g_2 = g_n\begin{bmatrix} \cos 2\theta \\ \sin 2\theta \end{bmatrix}$$

where the magnitude of the double-angle vector $g_2$ has an x component of $g_{2x}=g_n \cos 2\theta$, and a y component of $g_{2y}=g_n \sin 2\theta$, where the magnitude of the double-angle gradient vector $g_2$ is normalised, by multiplication by $$g_n = g(\Delta_x^2 + \Delta_y^2)^{-\frac{1}{2}},$$

so as to account for the distance between the two pixel positions at which the values were sampled.

A gradient sample can be considered to be in the single-angle domain. A double-angle gradient vector can be considered to be in the double-angle domain.

Figure 3A:
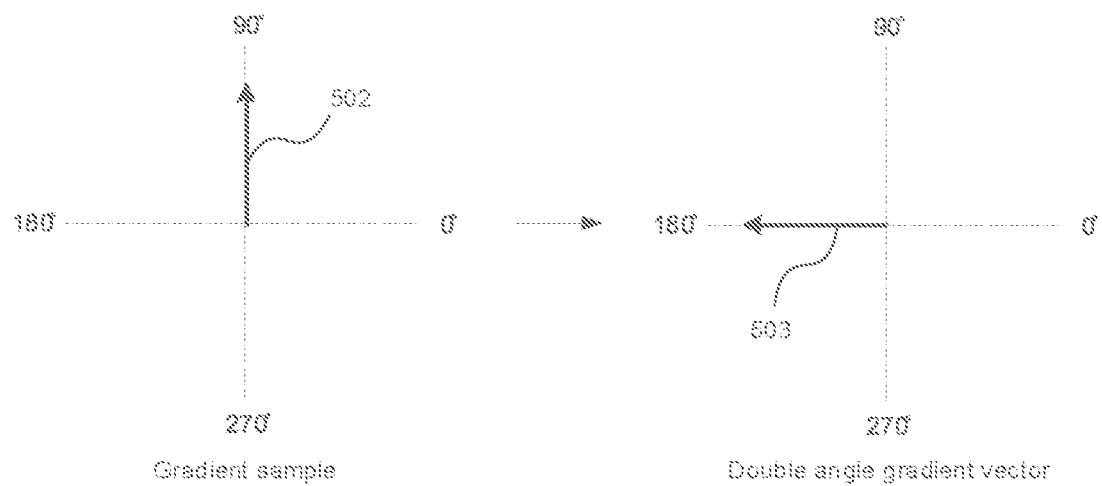
FIG. 3a is a schematic depicting the conversion of a first gradient sample to a double-angle gradient vector.
Figure 3B:
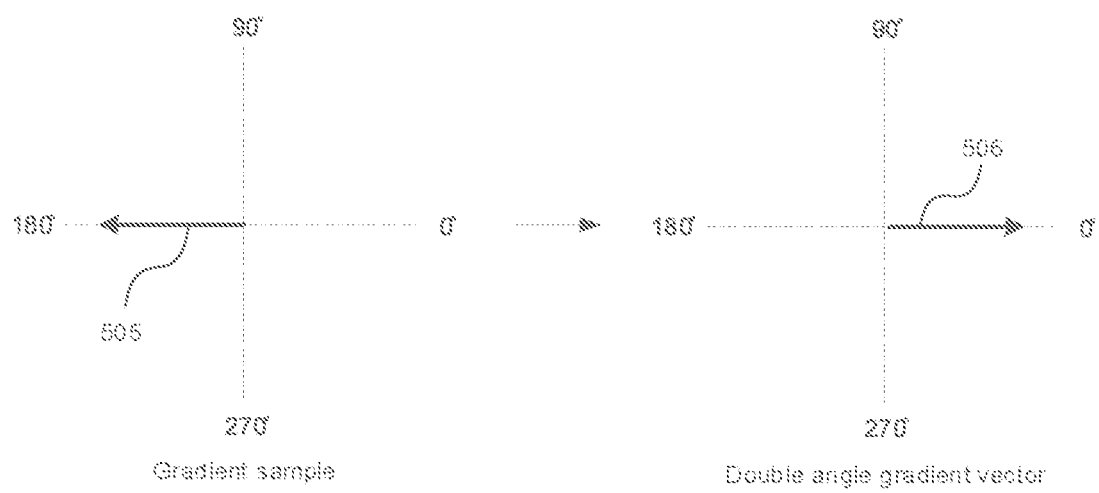
FIG. 3b is a schematic depicting the conversion of a second gradient sample to a double-angle gradient vector.

Conversion of gradient samples to double-angle gradient vectors can be performed in any appropriate manner. For example, FIGS. 3a and 3b represent gradient samples 502 and 505, and double-angle gradient vectors 503 and 506 in polar coordinates. With reference to FIG. 3a, a gradient sample 502 which points in the positive Y direction (e.g. ($\Delta_x$, $\Delta_y$)=(0,1), such that $\theta$=90°) is converted to a double-angle gradient vector 503 which points in the negative X direction (e.g. ($\Delta_x$, $\Delta_y$)=(-1, 0), such that $2\theta$=180°). With reference to FIG. 3b, a gradient sample 505 which points in the negative X direction (e.g. ($\Delta_x$, $\Delta_y$)=(-1, 0), such that $\theta$=180°), is converted to a double-angle gradient vector 506 which points in the positive X direction (e.g. ($\Delta_x$, $\Delta_y$)=(1,0), such that $2\theta$=360°=0°).

Thin-line structures are typically image features that have a width less than the width of the kernel used to observe or process them. That is, if a 3×3 kernel of pixels is used during image processing, a thin-line structure may be any feature having a width of less than three pixels. In an example, a thin-line structure in an image may be a dark line between two regions of lighter colour. Opposing gradient samples are often observed at thin-line structures. This is because the pixel value gradient typically reduces, or increases, greatly either side of a thin-line structure. For example, in the set of gradient samples for a target pixel on or close to a thin-line structure, there may be pairs of gradient samples in which each gradient sample has a direction roughly perpendicular to the thin-line structure, the gradient samples of the pair being at 180° to each other and both having the same or a similar magnitude. The gradient samples in such a pair of gradient sample may be considered to be opposing gradient samples.

In accordance with the method described herein, opposing gradient samples may be converted to co-directional double-angle gradient vectors. For example, opposing gradient samples may have directions 90° and 270°, such that when they are converted to double-angle gradient vectors, both double-angle gradient vectors have a direction of 180° (270°×2=540°, where 0°=360° ∴ 540°-360°=180°) and so are considered co-directional. One way to express this is to say that if a gradient sample has an angle of @ then an opposing gradient sample has an angle of ($\phi$+180°). The corresponding double-angle gradient vectors would be $2\phi$ and ($2\phi$+360°)=$2\phi$, i.e. the corresponding double-angle gradient vectors are codirectional.

Similarly, perpendicular gradient samples are converted to opposing double-angle gradient vectors. For example, if a gradient sample has an angle of $\phi$ then a perpendicular gradient sample may have an angle of ($\phi$+90°). The corresponding double-angle gradient vectors would be $2\phi$ and ($2\phi$+180°), i.e. the corresponding double-angle gradient vectors are opposing.

In this example, the conversion of gradient samples to double-angle gradient vectors is performed by representing gradient samples in polar coordinates and multiplying their angular components by two.

It will be appreciated that there may be other approaches to converting gradient samples to double-angle gradient vectors, any of which may be used in accordance with the principles described herein. For example, a distance-normalised, double-angle vector may be pre-computed for each $g_{(\Delta x, \Delta y)}$, according to:

$$g_n(1, 0) = g_n(-1, 0) = \begin{bmatrix} 1 \\ 0 \end{bmatrix},$$

$$g_n(1, 1) = g_n(-1, -1) = \frac{1}{\sqrt{2}}\begin{bmatrix} 0 \\ 1 \end{bmatrix},$$

$$g_n(0, 1) = g_n(0, -1) = \begin{bmatrix} -1 \\ 0 \end{bmatrix},$$

$$g_n(-1, 1) = g_n(1, -1) = \frac{1}{\sqrt{2}}\begin{bmatrix} 0 \\ -1 \end{bmatrix}.$$

This approach may be used when the number of pixels in the kernel of pixels is not greater than a pre-determined first threshold, and/or when the number of possible directions for each gradient sample is not greater than a pre-determined second threshold. For example, the first threshold may be nine pixels (e.g. a 3×3 kernel) and the second threshold may be eight possible directions (e.g. 0° to 360° in 45° intervals, where 0°=360°). The distance-normalised, double-angle vectors pre-computed in accordance with this approach may be stored in a look-up table for inspection. The first and second thresholds may be set in dependence on when it is deemed to be more efficient to pre-compute and store all possible double-angle vectors, rather than compute them in real-time.

Combining Double-Angle Vectors

The double-angle gradient vectors may be combined by the combining unit 204 to form a compound gradient vector for the target pixel.

The combining unit 204 may average the double-angle gradient vector samples of a kernel so as to determine the compound gradient vector for the target region. In an example, where two double-angle gradient sample vectors, $g_{2a}$, $g_{2b}$, have been determined, the compound gradient vector at a target pixel, $g'_2$, may be calculated according to:

$$g'_2 = 0.5(g_{2a} + g_{2b}).$$

The combining unit 204 may filter the double-angle gradient vector samples of a kernel so as to determine a compound gradient vector for the target region. The combining unit 204 may perform linear filtering of double-angle gradient vectors. Linear filtering may combine double-angle gradient vectors using a weighted sum. That is, linear filtering may be any process of the form:

$$g'_2 = \sum_{\forall i} w_i g_{2i},$$

where $w_i$ is a weight for the $i^{th}$ double-angle gradient vector $g_{2i}$.

Alternatively, the combining unit 204 may perform non-linear filtering to determine the compound gradient vector $g'_2$ from the double-angle gradient vectors $g_{2i}$.

Opposing gradient samples are often observed at thin-line structures in images. As has been explained above, opposing gradient samples are converted to co-directional double-angle gradient vectors. Thus, when averaged or filtered, the contributions of these double-angle gradient vector samples do not cancel one another. In contrast, in conventional gradient sample averaging approaches, opposing gradient samples would have cancelled. In this way, some information about the dominant local gradient an image, e.g. for thin-line structures, that would otherwise have been lost can be preserved, e.g. information is preserved to indicate that the dominant local gradient is perpendicular to the edges of a thin line.

In some examples, the magnitude of the gradient samples and/or double-angle gradient vectors may be disregarded such that only their directional information is considered during the formation of a compound gradient vector. For example, after gradient samples for a kernel of pixels have been determined, each gradient sample having a magnitude below a threshold may be discarded. For example, the threshold magnitude may be a multiple (e.g. 0.5 or 0.75) of the average magnitude of the gradient samples in the kernel. The remaining gradient samples may be assigned unitary magnitude (e.g. each vector is assigned a magnitude of 1) before conversion to double-angle gradient vectors. Alternatively, all gradient samples for a kernel may be converted to double-angle gradient vectors. In this example, each double-angle gradient vector having a magnitude below a threshold may be discarded. The remaining double-angle gradient vectors may be assigned unitary magnitude, before being combined to form a compound gradient vector. This can reduce the processing required to form compound gradient vectors.

Determining Dominant Gradient Orientation

The determining unit 205 may determine the dominant gradient orientation for the target region in dependence on the compound gradient vectors as described below.

The dominant gradient orientation may be determined by converting the compound gradient vector for a target region into a dominant gradient vector in the single-angle domain. In doing so, the direction of the dominant gradient vector may inherit 180° ambiguity. That is, although the angular orientation of the dominant gradient vector is known, it may not be known in which of the two opposing directions in that angular orientation the dominant gradient vector is directed. The angular orientation of the dominant gradient vector for a target region, determined as described herein, represents an output dominant gradient orientation for the target region.

For example, a compound gradient vector $g'_2$ having x and y components $g_{2x}'$ and $g_{2y}'$ at a target pixel, as determined in the double-angle domain as described above, can be converted to a dominant gradient vector, $g_1$, in the single-angle domain as follows:

$$\theta = \frac{1}{2} a\tan 2(g'_{2y}, g'_{2x})$$

$$g = \sqrt{g_2'^T g_2'},$$

$$g_1 = g \begin{bmatrix} \cos(\theta) \\ \sin(\theta) \end{bmatrix}$$

where the dominant gradient orientation (θ) at the target pixel position (x, y) may be determined by converting the angular component of the compound gradient vector into the single-angle domain. For example, this conversion may be performed by representing the compound gradient vector in polar coordinates and dividing the angular component by two. It will be appreciated that there may be other approaches to calculating or approximating the dominant gradient orientation (θ), any of which may be used in accordance with the principles described herein.

The magnitude of the dominant gradient vector may be calculated or approximated in any suitable manner. The magnitude (g) of the compound gradient vectors may remain unchanged and be used as the magnitude of the dominant gradient vector. In other examples, the magnitude (g) of the compound gradient vector may be halved or modified by some other fixed constant (e.g. division by √2). As described above, in some examples the magnitude information is disregarded.

Illustrative Examples

Figure 4:
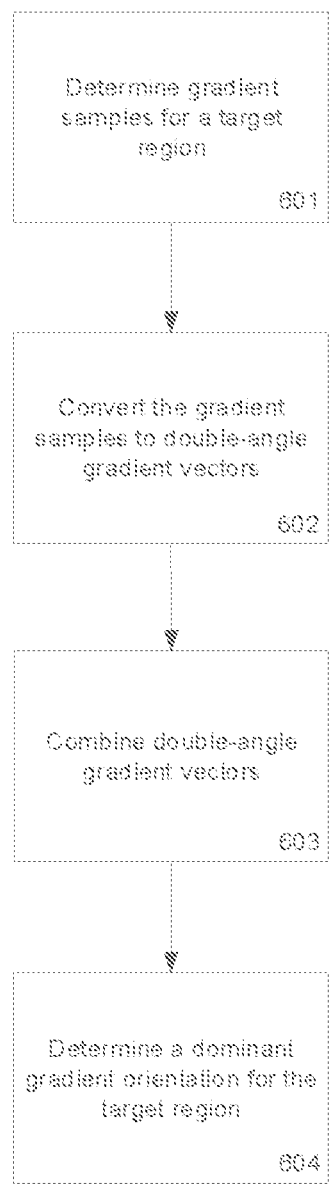
FIG. 4 is a flow diagram illustrating an exemplary method for determining a dominant gradient orientation.

FIG. 4 is a flow diagram illustrating an exemplary method for determining a dominant gradient orientation in accordance with the principles described herein. Gradient samples are determined 601 for a target region. The target region may be a region surrounding a target pixel or a plurality of target pixels. The gradient samples are converted 602 to double-angle gradient vectors. The double-angle gradient vectors are combined 603, e.g. by averaging or filtering, so as to form a compound gradient vector (in the double-angle domain) for the target region. The compound gradient vector for the target region may be converted to a dominant gradient vector (in the single-angle domain) so as to determine 604 the dominant gradient orientation for the target region. The process may be repeated for a plurality of target regions of the image. For example, the target region may be a region surrounding a target pixel, and the process may be repeated for each pixel of the image.

FIG. 5 is a schematic depicting the determination of a dominant gradient orientation. FIG. 5 depicts vectors in polar coordinates. Gradient samples 801 and 802 are shown. Gradient samples 801 and 802 may represent gradient samples formed for pixels either side of a target pixel (e.g. with reference to FIG. 2a, gradient samples for pixels 304 and 309 either side of target pixel 302). In this example, only two gradient samples are considered for simplicity.

Gradient samples 801 and 802 are opposing. That is, in FIG. 5, gradient samples 801 and 802 point in opposite directions and have the same magnitudes. Gradient sample 801 points in the positive Y-direction (e.g. $(\Delta_x, \Delta_y)=(0,1)$, such that θ=90°). Gradient sample 802 points in the negative Y-direction (e.g. $(\Delta_x, \Delta_y)=(0,-1)$, such that θ=270°). Opposing gradient samples are often observed about thin-line structures within an image. As described herein, thin-line structures are typically image features that have a width less than the width of the kernel.

Gradient samples 801 and 802 are converted 807 in accordance with the principles described herein to double-angle gradient vectors 803 and 804 respectively. In this example, the angular components of each gradient sample are doubled, whilst their magnitudes remain unchanged. Double-angle gradient vector 803 points in the negative X-direction, i.e. 90°×2=180°. Double-angle gradient vector 804 also points in the negative X-direction, i.e. 270°×2=540°=180°. Thus, double-angle gradient vectors 803 and 804 are co-directional. In this manner, opposing gradient samples in the single-angle domain have been converted to co-directional double-angle gradient vectors in the double-angle domain.

Double-angle gradient vectors 803 and 804 are combined 809 in accordance with the principles described herein so as to form a compound gradient vector 805 at the target pixel. In this example, double-angle gradient vectors 803 and 804 have been averaged. Compound gradient vector 805 points in the negative X-direction.

Compound gradient vector 805 is converted 810 into the single angle domain so as to form dominant gradient vector 806. Dominant gradient vector 806 is depicted by a double-headed arrow. This is because dominant gradient vector 806 inherits 180° ambiguity. That is, although the angular orientation of the dominant gradient vector 806 is known, it is not known in which of the two opposing directions in that angular orientation the dominant gradient vector is directed. The angular orientation of the dominant gradient vector 806 at a target pixel represents the dominant gradient orientation at the target pixel.

As shown in FIG. 5, double-angle vectors 803 and 804 do not cancel one another during combination. Instead, they combine to form compound gradient vector 805, which is in turn converted to dominant gradient vector 806. Dominant gradient vector 806 can provide information about the local gradient about the target pixel, e.g. regarding a thin-line structure. In contrast, in conventional approaches gradient samples 801 and 802 would have cancelled each other during averaging and information regarding the local gradient, e.g. regarding a thin-line structure, would have been lost.

Figure 6:
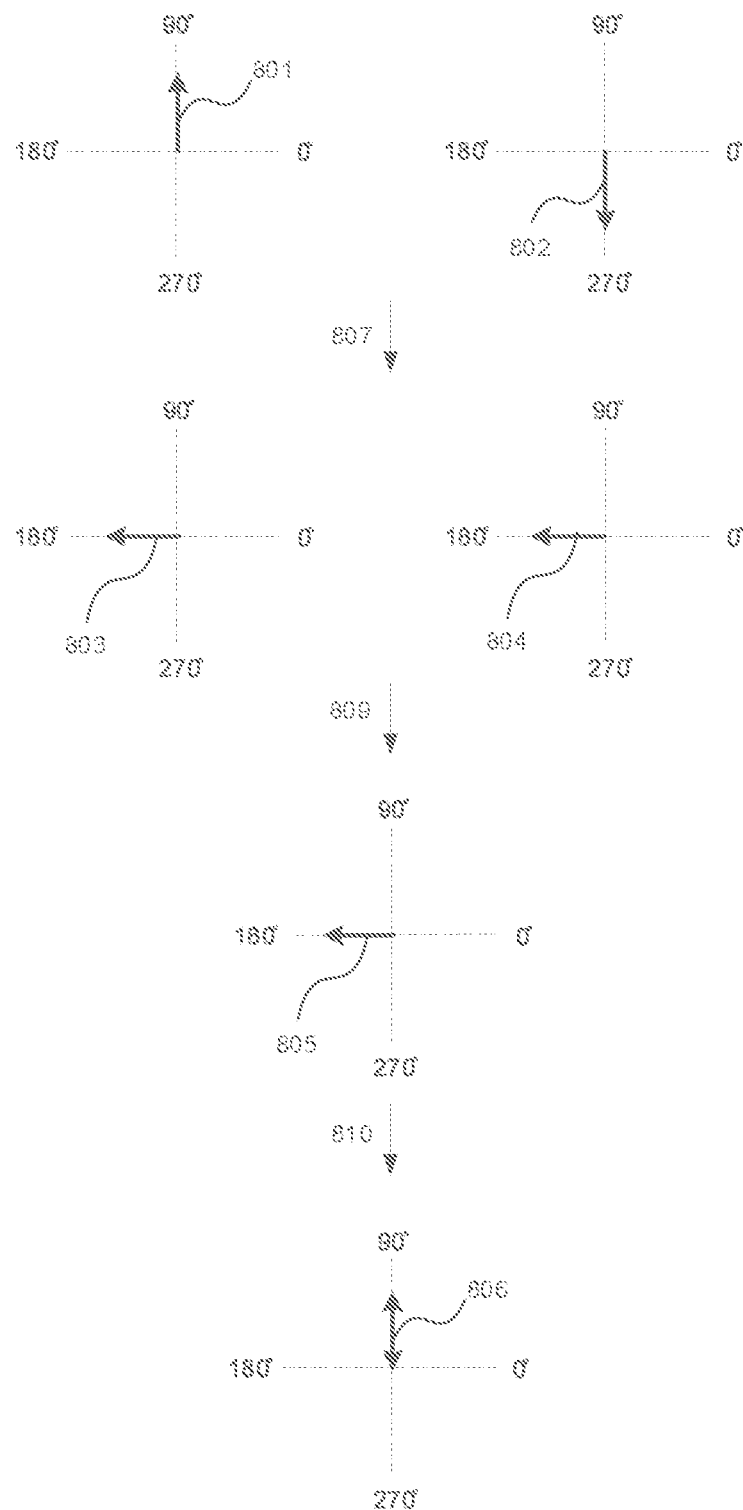
FIG. 6 depicts exemplary conventional average gradient directions and dominant gradient orientations for a thin-line structure.
Figure 6:
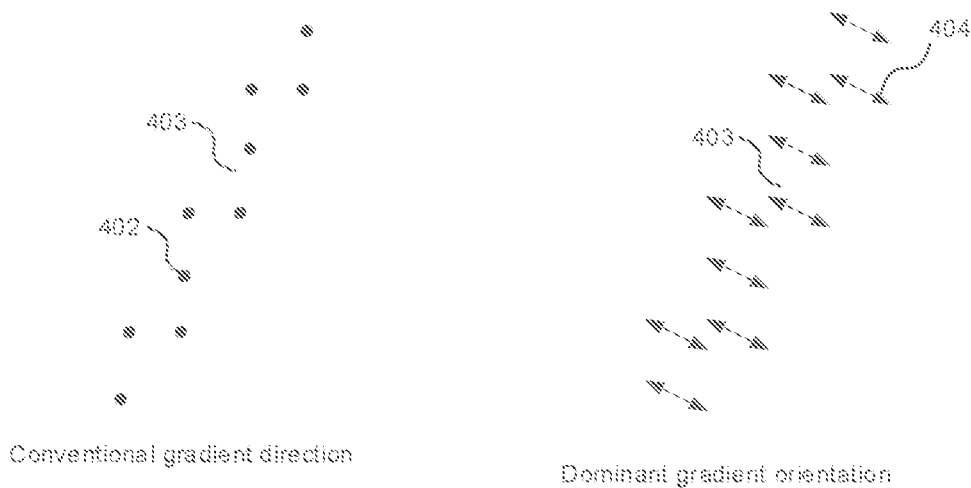

FIG. 6 depicts exemplary conventional average gradient directions and dominant gradient orientations determined in accordance with the principles defined herein for a thin-line structure.

As described herein, thin-line structures are typically image features that have a width less than the width of a kernel being used to process the image. In an example, a thin-line structure in an image may be a dark line between two regions of lighter colour. FIG. 6 depicts a grey line 403 on a white background. The pixel value gradient considered may be a colour gradient representing a variation in one or more pixel values relating to colour. In this example, the colour gradient each side of the line may be high. As described herein, opposing gradient samples are often observed at thin-line structures. This is because the pixel value gradient typically reduces, or increases, greatly either side of a thin-line structure—in this example, from grey to white.

In conventional approaches, gradient samples are averaged to find a local gradient vector for each target region. When averaged, opposing gradients cancel out. Therefore, as depicted on the left-hand-side of FIG. 6, all information regarding the colour gradient about line 403 may be lost during this process. This is schematically depicted in FIG. 6 by dots 402—each indicating that no gradient vector exists for the dotted pixel position.

In contrast, by determining dominant gradient orientations in accordance with the principles described herein, information regarding the colour gradient about line 403 is maintained. As described with reference to FIG. 5, opposing gradient samples can be converted to double-angle gradient vectors which are combined, without cancelling, so as to determine a dominant gradient vector. The dominant gradient vectors 404 may have an orientation that is perpendicular to the longitudinal direction of the line 403—as depicted on the right-hand-side of FIG. 6. Thus, information regarding the orientation of a thin-line structure may be preserved.

The method and system for determining dominant gradient orientations described herein may also have advantages when assessing the pixel value gradients at corners—as well as thin-line structures.

Figure 7:
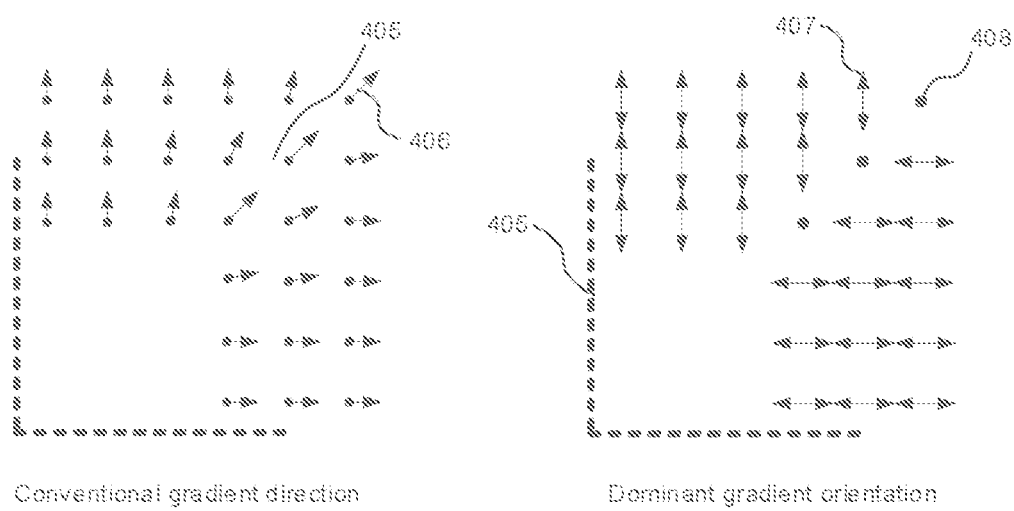
FIG. 7 depicts exemplary conventional average gradient directions and dominant gradient orientations for a right-angled corner.

FIG. 7 depicts exemplary conventional gradient directions and dominant gradient orientations determined in accordance with the principles defined herein for a right-angled corner.

FIG. 7 depicts an upper-right-hand portion of a block of colour 405 on white background. The block of colour defines a right-angled corner. The pixel value gradient considered may be a colour gradient representing a variation in one or more pixel values relating to colour. In this example, the colour gradients may be high about the border of the block of colour. Colour gradient samples may be directed perpendicular to each of the edges delimiting of a block of colour—e.g., in FIG. 7, where the colour components of the pixel values transition from grey to white. Thus, orthogonal gradient samples are often observed at right-angled corners.

In some conventional approaches, gradient samples are averaged to find a local gradient vector for each target region. In an example, when averaged, two orthogonal gradients having angular components of 0° and 90° output an average gradient direction of 45°. Therefore, as depicted on the left-hand-side of FIG. 7, gradient directions 406 determined in a conventional manner appear to vary smoothly around the right-angled corner.

In contrast, by determining dominant gradient orientations in accordance with the principles described herein, orthogonal gradient samples are converted to opposing double-angle gradient vectors. For example, gradient samples having angular components of 90° and 180° respectively may be converted to double-angle gradient vectors having angular components of 180° and 360° (where 0°=360°) respectively. Thus, when combined to form compound gradient vectors 407 in accordance with the principles described herein, the double-angle gradient vectors at the right-angled corner will cancel each other. This is schematically depicted in FIG. 7 by dots 408—each indicating that no double-angle gradient vector exists for the dotted pixel position. Because of this an abrupt change in the dominant gradient orientation may be observed at the right-angled corner, as shown on the right-hand side of FIG. 7, rather than an artificially gradual change as is observed using conventional average gradient directions, as shown on the left-hand side of FIG. 7.

Two-Stage Image Processing

The method of determining a dominant gradient orientation in an image described herein may be used as a first stage in a two-stage image processing method.

Figure 8:
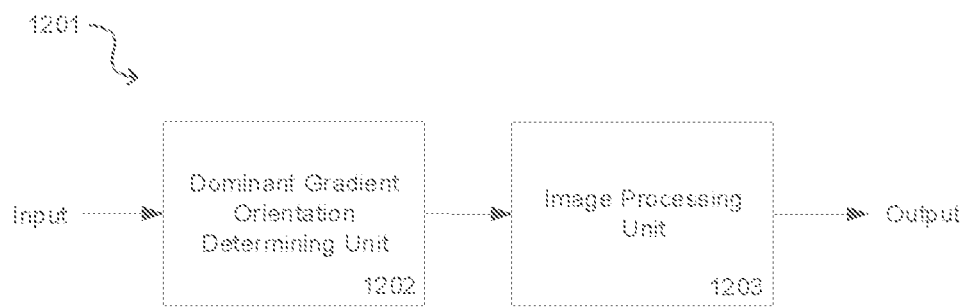
FIG. 8 depicts a system for performing a two-stage image filtering process.

FIG. 8 depicts a system 1201 for performing a two-stage image processing method. System 1201 includes a dominant gradient orientation determining unit 1202 and an image processing unit 1203. Although not shown, dominant gradient orientation determining unit 1202 may comprise a gradient sampling unit 202, a conversion unit 203, a combining unit 204 and a determining unit 205 (as depicted by FIG. 1).

Dominant gradient orientation determining unit 1202 may determine dominant gradient orientations for an image in accordance with the principles described herein. In an example, dominant gradient orientation determining unit 1202 may output a vector map, or separate magnitude and orientation maps, representing the dominant gradient orientations determined for the image. In an example, dominant gradient orientation determining unit 1202 may output one or more dominant gradient vectors for a target region in response to a request from image processing unit 1203. For example, the image processing unit may send such a request in advance of processing the target region.

The dominant gradient orientations determined by unit 1202 are passed to the image processing unit 1203 and are used by the image processing unit 1203 to process the image (e.g. to apply filtering to the image). A dominant gradient orientation does not represent the same thing as an average gradient. In many situations they will point in the same direction, but in some situations (such as when thin-line structures and/or corners are present within a kernel) they will not point in the same direction. A dominant gradient orientation indicates an orientation of the gradients within a kernel which is dominant even if there are image structures with different gradients within the kernel. For example, a dominant gradient orientation will provide useful information even when structures such as thin-lines and corners are present within the kernel. In contrast, average (e.g. mean) gradients will not necessarily provide useful information when structures such as thin-lines and corners are present within the kernel. The dominant gradient orientations determined by the dominant gradient orientation determining unit 1202 are 180° ambiguous, but for some operations performed by the image processing unit 1203 this is not a problem. For example, the image processing unit 1203 may perform some anisotropic operations on the image based on the dominant gradient orientations wherein the anisotropic operations are not affected by a 180° ambiguity. An example of such an anisotropic operation is anisotropic filtering, which may use an anisotropic filter kernel (e.g. an elliptical filter kernel).

Image processing unit 1203 may perform filtering (e.g. bilateral filtering), and/or any other known image processing method. Image processing unit 1203 may use the vector map, or one of the separate magnitude and orientation maps, output by the dominant gradient orientation determining unit 1202 to steer an image filter. The determined dominant gradient orientations may be used to, for example, steer (i.e. orientate) an anisotropic sampling filter—enabling thin-line structure information to be better preserved during that filtering step.

Figure 9:
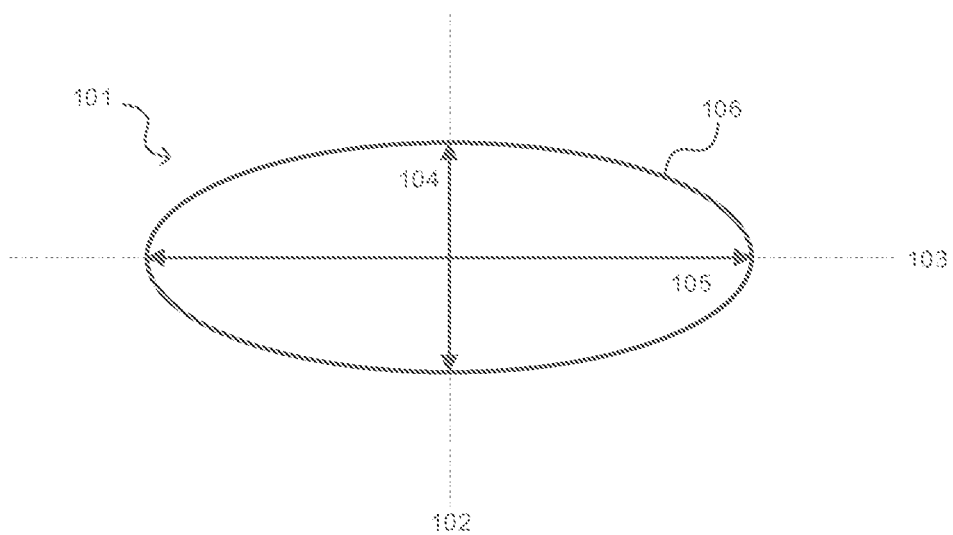
FIG. 9 depicts an anisotropic sampling filter of the type that can be steered using dominant gradient orientation information.

In an example, image processing unit 1203 comprises a local shape estimator that uses gradient information to steer an anisotropic sampling filter. For example, as depicted in FIG. 9, an elliptical sampling filter 101 may be used. The ellipse 106 may represent an asymmetric kernel of pixels.

The size of the kernel used during filtering often determines how small or thin an object can be resolved during filtering. Thin-line structures are typically image features that have a width less than the width of the kernel being used to filter an image. Thin-line structures are typically blurred when filtered because the pixel values that define the thin-line structure can be averaged or otherwise combined with other pixel values within the kernel that neighbour the thin-line structure. The greater the proportion of other pixels that neighbour a thin-line structure to pixels representing that structure, the more the thin-line structure may be blurred (because the pixel values defining the thin-line structure contribute proportionately less to the averaged or otherwise combined filtered pixel value output for that kernel).

An elliptical filter 101 may be steered such that the minor axis 102 of the ellipse is aligned with the dominant gradient orientation. The axes of the ellipse may be considered to have 180° ambiguity, as represented by double-headed arrows 104, 105, in the same way that the dominant gradient orientation has 180° ambiguity. Steering an asymmetric filter using dominant gradient information can reduce the blurring of thin-line structures. As shown in FIG. 6, the dominant gradient orientations for a thin-line structure are typically perpendicular to the longitudinal direction of that structure. That is, in the same direction as the smallest dimension of the thin-line structure. By aligning the dominant gradient orientation with the minor axis of an elliptical filter—that is, the axis spanning the fewest pixels—the proportionately higher number of pixels representing the thin-line structure, compared to other neighbouring pixels, contribute to the filtered pixel value output for that kernel. Thus, the blurring of thin-line structures may be reduced.

The major axis 103 of the elliptical filter may be the axis in which samples are collected over the largest distance. That is, a greater number of pixels may be considered. The major axis of the elliptical filter may be aligned with the longitudinal axis of a thin-line structure, which is typically considerably longer than the width of the thin-line structure. Because of this, the contribution of other pixel values that neighbour a thin-line structure in the longitudinal direction is not such a concern in terms of blurring the thin-line structure. In this way, the image filtering step can be performed more efficiently, reducing the computational cost of image processing whilst minimising blurring of thin-line structures—in comparison to using smaller, symmetric, kernels.

As described above, the elliptical filter 101 may be oriented based on the dominant gradient orientation (e.g. such that the minor axis of the ellipse is aligned with the dominant gradient orientation). Furthermore, in some examples, the eccentricity of the ellipse 106 may be determined based on the magnitude of the dominant gradient vector such that the eccentricity may be increased for gradients with larger magnitudes (e.g. representing thinner lines), and the eccentricity may be decreased for gradients with smaller magnitudes (e.g. representing thicker lines, or areas where there are no line structures present).

Applications for anisotropic sampling filters include edge-preserving noise reduction filters, and de-mosaicing filters used to reconstruct full colour images from mosaic (colour filter array) images (also known as de-Bayer in the case of a Bayer colour filter array).

FIG. 10 depicts idealised dominant gradient orientations for various thin-line structures. The idealised dominant gradient orientations for these structures may be the ideal orientations in which to steer an anisotropic filter—so as to minimise blurring of these structures. The idealised dominant gradient orientations are depicted at target pixels 702*a*, 702*b*, 702*c*, 702*d* and 702*e*. FIG. 10*a* depicts a straight edge. FIG. 10*b* depicts a 45° intersection of two straight edges. FIG. 10*c* depicts a 90° intersection of two straight edges.

FIG. 10d depicts a 135° intersection of two straight edges.
FIG. 10e depicts a 180° intersection of two straight edges, i.e. a thin-line structure.

The method and system for determining dominant gradient orientations described herein may output dominant gradient orientations that are closer to the idealised dominant gradient direction than the gradient directions output by conventional averaging approaches.

FIG. 11 compares the results of combining gradient samples [1 0] and [cos ($\theta$) sin($\theta$)] over a range of values for $\theta$ using both the conventional average gradient direction approach and using the system described herein. The vector notation here represents [$\Delta_x$ $\Delta_y$]. The gradient sample [1 0] points in the positive X-direction. As the $\theta$ value over which the comparison is performed varies, the direction in which the gradient sample [cos ($\theta$) sin($\theta$)] points varies. In the conventional approach the gradient samples are averaged. In the system described herein, the gradient samples are first converted to double-angle gradient vectors before combination in accordance with the principles described herein. When combining gradient samples [1 0] and [cos ($\theta$) sin($\theta$)] both gradient samples have the same magnitude, and so neither gradient sample can be considered dominant.

Figure 11A:
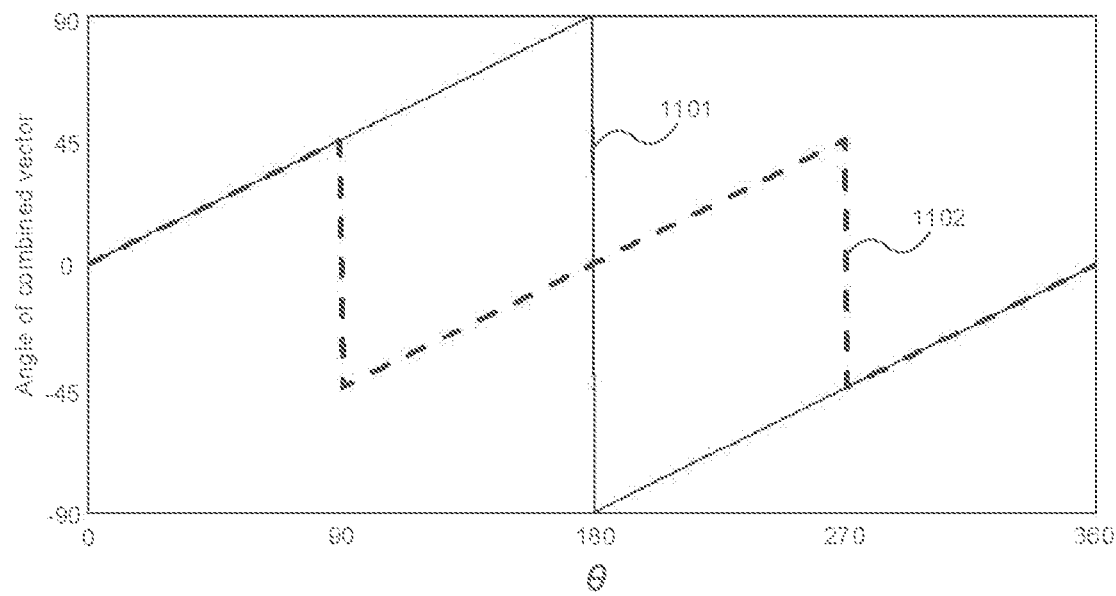
FIG. 11a and FIG. 11b compares the results of combining gradient samples using both the conventional average gradient direction approach and using the method described herein.

FIG. 11a depicts plots representing the angular component of the vector resulting from a combination of samples [1 0] and [cos ($\theta$) sin($\theta$)] over a range of $\theta$ using both the conventional average gradient direction approach 1101 and using the system described herein 1102.

Figure 11B:
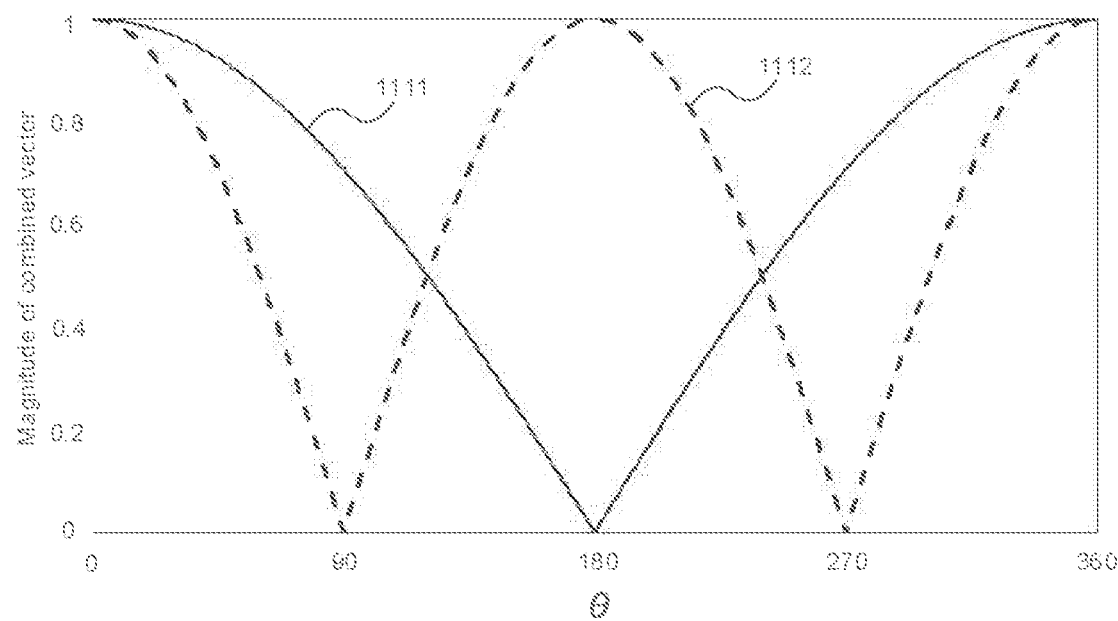

FIG. 11b depicts plots representing the magnitude of the vector resulting from combination a combination of samples [1 0] and [cos ($\theta$) sin($\theta$)] over a range of $\theta$ using both the conventional average gradient direction approach 1111 and using the system described herein 1112. In an example, when $\theta$=180, [cos ($\theta$) sin($\theta$)]=[−1 0]. In an example, when $\theta$=180, gradient samples [1 0] and [cos ($\theta$) sin($\theta$)] are opposing gradient samples. As shown in FIG. 11b, when $\theta$=180 the plot for conventional average gradient direction approach 1111 reads a combined vector having a magnitude of 0. This is because the opposing vectors have cancelled. In contrast, the plot 1112 for the system described herein reads a compound gradient vector having a magnitude of 1.

FIG. 12 compares the results of combining gradient sample vectors of different magnitude using both the conventional average gradient direction approach and using the system described herein. In FIG. 12 the vectors considered are [2 0] and [cos ($\theta$) sin($\theta$)] over a range of values for $\theta$. When combining gradient samples [2 0] and [cos ($\theta$) sin($\theta$)], the gradient sample [2 0] has a magnitude twice that of [cos ($\theta$) sin($\theta$)], and so [2 0] can be considered to be dominant. This case is common when measuring gradients close to a corner, but not exactly at the vertex.

Figure 12A:
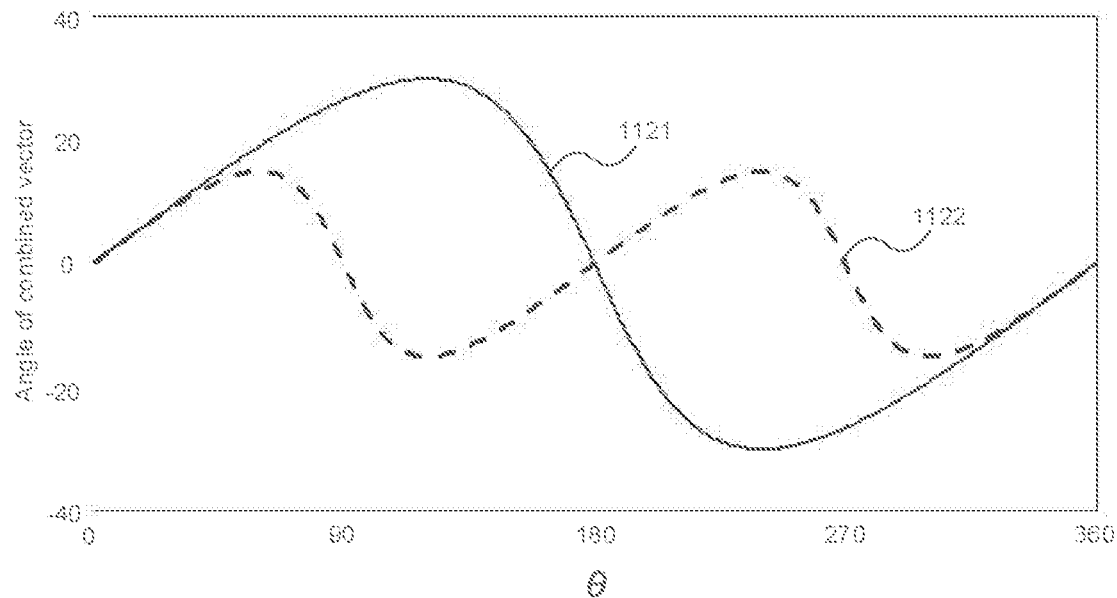
FIG. 12a and FIG. 12b compares the results of combining gradient sample vectors of different magnitude using both the conventional average gradient direction approach and using the method described herein.

FIG. 12a depicts plots representing the angular component of the vector resulting from a combination of samples [2 0] and [cos ($\theta$) sin($\theta$)] over a range of $\theta$ using both the conventional average gradient direction approach 1121 and using the system described herein 1122.

Figure 12B:
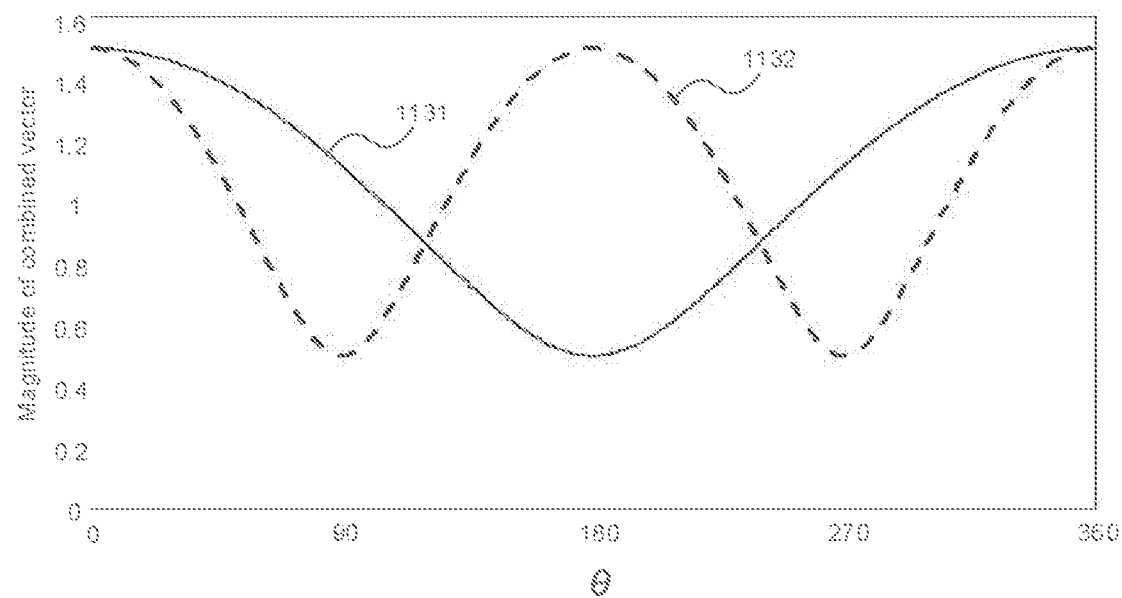

FIG. 12b depicts plots representing the magnitude of the vector resulting from combination a combination of samples [2 0] and [cos ($\theta$) sin($\theta$)] over a range of $\theta$ using both the conventional average gradient direction approach 1131 and using the system described herein 1132.

FIGS. 11 and 12 show that the method described herein approximates the idealised dominant gradients, depicted in FIG. 10, more closely than the conventional averaging gradient direction approach. For example, with reference to FIG. 12, the results of the method described herein deviate from the dominant 0° direction by up to 15°, where the conventional method deviates by as much as 30°. The results of the method described herein show the lowest gradient magnitude when the vectors are perpendicular—that is, when $\theta$=90 and $\theta$=270, therefore [cos ($\theta$) sin($\theta$)]=[0 1] or [0 −1], both of which are perpendicular to [1 0] (FIG. 11) and [2 0] (FIG. 12). The result of the conventional approach has the lowest magnitude where the vectors are opposite directions (e.g. when $\theta$=180, as shown above). As described herein, a structure thinner than the kernel can give rise to gradient samples in opposite directions. The method described herein yields a strong gradient result in this case (e.g. at $\theta$=180° in FIGS. 11 and 12), but the conventional method shows a low response as it averages out the opposing vectors. As another example, a right-angled corner structure in the kernel can give rise to gradient samples in perpendicular directions. The method described herein yields a weak gradient result in this case (e.g. at $\theta$=90° or at $\theta$=270° in FIGS. 11 and 12) because there is not a strongly dominant orientation, whereas the conventional averaging method shows a fairly strong gradient in this case.

Each pixel value may have multiple components. For example, each pixel may have multiple colour components such as RGB or YUV. Where pixel values have more than one component, c, gradient samples may be determined for each component separately. The separately determined gradient samples may then be summed. Alternatively, the gradient samples for each of multiple components may first be converted to double-angle gradient vectors, before being summed. The method then proceeds as described herein, in the same manner as for an image with a single component. Other methods of combining the gradient samples or double-angle gradient vectors for multiple colour components may be possible, e.g. a weighted sum, or sum of squared sample values.

The principles described herein may be applied to any other form of pixel data, such as Bayer data (in which each pixel position comprises a single colour value).

The image processing system of FIGS. 1 and 8 are shown as comprising a number of functional blocks. This is schematic only and is not intended to define a strict division between different physical or logical elements of such entities. For example, one or more of the schematic units 202 to 205 may be provided by a single physical or logical processing entity, and there may be any number of physical or logical processing entities that collectively perform the functions of the schematic units 202 to 205. Each functional block may be provided in any suitable manner and an image processing system configured in accordance with the principles set out herein may comprise any number of physical or logical entities. It is to be understood that intermediate values described herein as being formed by an image processing system need not be physically generated by the image processing system at any point and may merely represent logical values which conveniently describe the processing performed by the image processing system between its input and output.

The image processing systems described herein may be embodied in hardware on an integrated circuit. The image processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture an image processing system configured to perform any of the methods described herein, or to manufacture an image processing system comprising any apparatus described herein. An integrated circuit definition dataset may be, for example, an integrated circuit description.

There may be provided a method of manufacturing, at an integrated circuit manufacturing system, an image processing system as described herein. There may be provided an integrated circuit definition dataset that, when processed in an integrated circuit manufacturing system, causes the method of manufacturing an image processing system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an image processing system will now be described with respect to FIG. 13.

Figure 13:
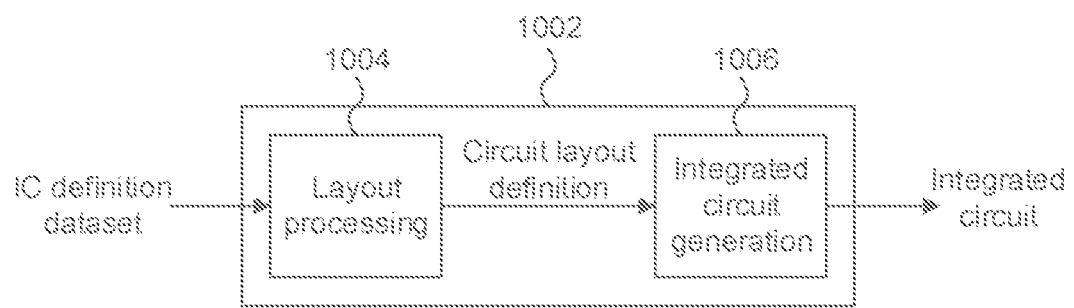
FIG. 13 is a schematic diagram of an integrated circuit manufacturing system.

FIG. 13 shows an example of an integrated circuit (IC) manufacturing system 1002 which is configured to manufacture an image processing system as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining an image processing system as described in any of the examples herein), process the IC definition dataset, and generate an IC according to the IC definition dataset (e.g. which embodies an image processing system as described in any of the examples herein). The processing of the IC definition dataset configures the IC manufacturing system 1002 to manufacture an integrated circuit embodying an image processing system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a image processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause a integrated circuit manufacturing system to generate a device as described herein. For example, the configuration of an integrated circuit manufacturing system in the manner described above with respect to FIG. 13 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 13, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of steering an anisotropic filter configured to filter pixel values in an image, the method comprising:
    determining a dominant gradient orientation for a target region within the image by:
        converting gradient samples for the target region into double-angle gradient vectors,
        combining the double-angle gradient vectors to determine a compound gradient vector for the target region, and
        converting the compound gradient vector to a dominant gradient vector, the dominant gradient vector representing the dominant gradient orientation for the target region; and
    steering the anisotropic filter in dependence on the determined dominant gradient orientation.

2. The method of claim 1, wherein the anisotropic filter uses an asymmetric filter kernel which has a minor axis and a major axis.

3. The method of claim 2, wherein the filter kernel is an elliptical filter kernel.

4. The method of claim 2, wherein the minor axis is the axis of the filter kernel in which samples are collected over the smallest distance, and the major axis is the axis of the filter kernel in which samples are collected over the largest distance.

5. The method of claim 2, wherein steering the anisotropic filter comprises aligning the minor axis of the filter kernel with the determined dominant gradient orientation.

6. The method of claim 2, wherein steering the anisotropic filter comprises aligning the minor axis of the filter kernel with the determined dominant gradient orientation so as to align the major axis of the filter kernel with the longitudinal axis of a thin-line structure in the image.

7. The method of claim 6, wherein aligning the minor axis of the filter kernel with the determined dominant gradient orientation reduces blurring of the thin-line structure in the image during filtering.

8. The method of claim 2, the method further comprising determining the eccentricity of the filter kernel in dependence on the magnitude of the dominant gradient vector.

9. The method of claim 8, wherein the eccentricity of the filter kernel is larger for dominant gradient vectors with larger magnitudes, and the eccentricity of the filter kernel is smaller for dominant gradient vectors with smaller magnitudes.

10. The method of claim 9, wherein dominant gradient vectors with larger magnitudes represent thinner line structures in the image, and dominant gradient vectors with smaller magnitudes represent thicker line structures in the image or areas of the image where there are no line structures present.

11. The method of claim 1, the method further comprising using the steered anisotropic filter to perform edge-preserving noise reduction filtering and/or to reconstruct full colour images from mosaic images by performing de-mosaicing filtering.

12. The method of claim 1, wherein the target region is a region surrounding a target pixel in the image.

13. The method of claim 1, wherein each of the gradient samples for the target region represents a variation in pixel values within the target region.

14. The method of claim 1, the method further comprising determining the gradient samples for the target region.

15. The method of claim 14, wherein the target region is a region surrounding a target pixel, and each of the gradient samples is determined by determining a difference between: (i) the pixel value at the target pixel, and (ii) a pixel value of a neighbouring pixel positioned in a respective direction with respect to the target pixel.

16. The method of claim 1, wherein converting the gradient samples into double-angle gradient vectors comprises encoding each gradient sample with a double-angle gradient vector that has an angle twice that of the gradient sample.

17. The method of claim 1, wherein the dominant gradient vector has an angle half that of the compound gradient vector.

18. The method of claim 1, wherein converting the gradient samples into double-angle gradient vectors comprises multiplying their angular components by two, and converting the compound gradient vector to the dominant gradient vector comprises dividing its angular component by two.

19. An image processing system configured to perform anisotropic filtering of pixel values in an image, the image processing system comprising:
   a conversion unit configured to convert gradient samples for the target region into double-angle gradient vectors;
   a combining unit configured to combine the double-angle gradient vectors to determine a compound gradient vector for the target region;
   a determining unit configured to convert the compound gradient vector to a dominant gradient vector, the dominant gradient vector representing the dominant gradient orientation for the target region; and
   an image processing unit configured to steer an anisotropic filter in dependence on the determined dominant gradient orientation.

20. A non-transitory computer readable storage medium having stored thereon computer readable instructions that, when executed at a computer system, cause the computer system to perform a method of steering an anisotropic filter configured to filter pixel values in an image, comprising:
   determining a dominant gradient orientation for a target region within the image by:
      converting gradient samples for the target region into double-angle gradient vectors,
      combining the double-angle gradient vectors to determine a compound gradient vector for the target region, and
      converting the compound gradient vector to a dominant gradient vector, the dominant gradient vector representing the dominant gradient orientation for the target region; and
   steering the anisotropic filter in dependence on the determined dominant gradient orientation.

* * * * *